United States Patent
Bir et al.

(10) Patent No.: US 11,320,868 B2
(45) Date of Patent: May 3, 2022

(54) LIQUID INGRESS CONTROL FOR ELECTRONIC DEVICES

(71) Applicant: Apple Inc., Cupertino, CA (US)

(72) Inventors: Karan Bir, Cupertino, CA (US); Adam T. Garelli, Morgan Hill, CA (US); Bryan W. Posner, San Francisco, CA (US); Denis H. Endisch, Cupertino, CA (US); Simon R. Lancaster-Larocque, San Jose, CA (US)

(73) Assignee: APPLE INC., Cupertino, CA (US)

( * ) Notice: Subject to any disclaimer, the term of this patent is extended or adjusted under 35 U.S.C. 154(b) by 126 days.

(21) Appl. No.: 16/554,552

(22) Filed: Aug. 28, 2019

(65) Prior Publication Data

US 2021/0064095 A1    Mar. 4, 2021

(51) Int. Cl.
*G06F 1/16*    (2006.01)
*E05D 11/00*    (2006.01)

(52) U.S. Cl.
CPC ........ *G06F 1/1656* (2013.01); *E05D 11/0081* (2013.01); *G06F 1/1616* (2013.01); *G06F 1/1683* (2013.01); *E05Y 2900/606* (2013.01)

(58) Field of Classification Search
None
See application file for complete search history.

(56) References Cited

U.S. PATENT DOCUMENTS

| | | | |
|---|---|---|---|
| 2009/0020962 A1* | 1/2009 | Shinoda | H05K 5/069 277/650 |
| 2014/0057482 A1* | 2/2014 | Su | H01R 12/594 439/493 |
| 2018/0113493 A1* | 4/2018 | Silvanto | E05D 11/1028 |

\* cited by examiner

*Primary Examiner* — James Wu
*Assistant Examiner* — Christopher L Augustin
(74) *Attorney, Agent, or Firm* — Dorsey & Whitney LLP

(57) ABSTRACT

Invasive material ingress mitigation and control features are positioned in a hinge that uses a flexible cable and cable cover at a gap between housings of a portable electronic device. The features include hydrophobic materials on the cover or a cover-facing surface of the device housing, a barrier between the cover and the device housing, channels or protrusions on the cover-facing surface of the top case, a series of different top case surface feature modifications, and a flex cover profile modification that controls and limits contacting surface area between the cover and the top case.

11 Claims, 8 Drawing Sheets

LIQUID INGRESS CONTROL FOR ELECTRONIC DEVICES

FIELD

The present disclosure relates generally to hinge assemblies for electronic devices. More particularly, the present disclosure relates to liquid ingress control features for hinge assemblies.

BACKGROUND

Many consumer electronic devices have multiple housing sections. Often, electronic signals must be sent from one housing section to another housing section. Electronic devices may have electronics in one housing section that receive a signal from electronics in another housing section. For example, a laptop computing device may have a display mounted in a display housing section that receives signals from a timing controller mounted in another housing section. The display housing section may also rotate or be movable in relation to another housing section through a hinge. For example, many laptop computers have a display housing section that rotates around a hinge assembly to facilitate viewing of the display at various viewing angles and to allow access to user input controls located on a main housing assembly.

One challenge associated with a hinged electronic device enclosure is securely routing a signal from one housing section to another housing section. Some electronic devices route a signal transfer mechanism, such as a flexible ribbon-like cable, around the hinge mechanism or through a center hole in a clutch assembly of the hinge. However, these cables must be protected from exposure to users and from over-bending caused by the actuation of the clutch assembly, hinge mechanism, and relative movement of other computer components. As electronic devices get smaller and thinner, the amount of space available for clutch assemblies, hinges and cables is constrained, making it more difficult to provide room for and properly protect the cables. Additionally, ingress of liquids and debris into those tight spaces increases the chance of failures and a degraded user experience. There is therefore a constant need for improvements to cables and hinge assemblies for electronic devices.

SUMMARY

Aspects of the present disclosure relate to a portable computing device. The device can include an upper housing portion, a lower housing portion pivotally connected to the upper housing portion by a hinge, a flexible band extending into the upper housing portion and into the lower housing portion, with the flexible band having a top surface, and a barrier device positioned between the top surface of the flexible band and at least one of the upper and lower housing portions.

In some embodiments, the barrier device can comprise a foam material or a hydrophobic material. The barrier device can be attached to the flexible band. The flexible band can be movable relative to the lower housing portion along an axis of motion, wherein the barrier device is elongated perpendicular to the axis of motion. The barrier device can be slidable against a surface of at least one of the flexible band, the upper housing portion, and the lower housing portion. The barrier device can also extend across a lateral width dimension of the flexible band.

In some embodiments, a cable is positioned between the hinge and the flexible band, with the cable connecting a first electronic component in the upper housing portion to a second electronic component in the lower housing portion. The barrier device can extend across a lateral width dimension of the cable.

Another aspect of the disclosure relates to a portable computing device which comprises a lid housing, a base housing pivotally connected to the lid housing, with the base housing having a downward-facing surface and with the downward-facing surface having a transition edge, and a flexible band extending into the base housing and into the lid housing, with the flexible band having an upward-facing surface. The upward-facing surface can include a first portion contacting the transition edge and a second portion spaced away from the downward-facing surface.

The upward-facing surface can be slidable against the transition edge. The downward-facing surface can comprise a channel, wherein the second portion is vertically aligned with the channel. The downward-facing surface can comprise a protrusion, wherein the transition edge is positioned on the protrusion. The transition edge can be raised relative to a groove in the downward-facing surface. The downward-facing surface can comprise a first angled surface portion and a second angled surface portion, wherein each of the first and second angled surface portions adjoin the transition edge. The first and second portions can be laterally aligned on the flexible band relative to a longitudinal axis of the flexible band.

Yet another aspect of the disclosure relates to a laptop computer comprising a lid housing, a base housing pivotally connected to the lid housing, with the base housing having an internal surface and with the internal surface having a bottom surface and two adjoining side surfaces, a flexible band extending into the base housing and having a longitudinal axis and a top surface facing the internal surface. The top surface of the flexible band and the bottom and two adjoining side surfaces of the base housing can form a perimeter of an aperture extending parallel to the longitudinal axis across the top surface of the flexible band.

The perimeter of the aperture can be formed in a channel in the internal surface. The aperture can also be configured to receive fluid flow traveling on the flexible band parallel to the longitudinal axis. A hydrophobic material can be positioned on the internal surface of the base housing or the top surface of the flexible band.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
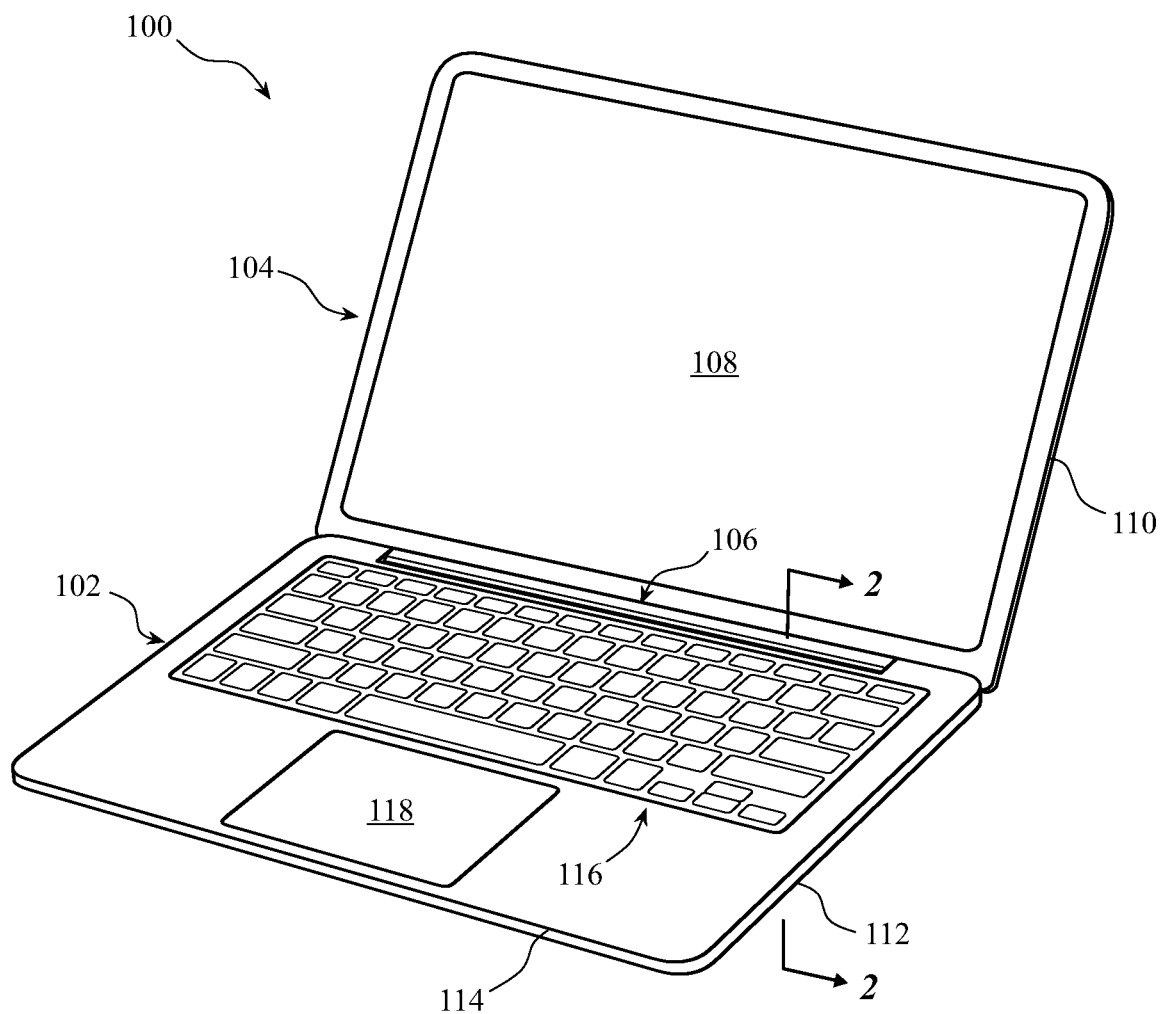
FIG. 1 shows an isometric view of a computing device.

Reference will now be made in detail to representative embodiments illustrated in the accompanying drawings. It should be understood that the following descriptions are not intended to limit the embodiments to one preferred embodiment. To the contrary, the descriptions are intended to cover alternatives, modifications, and equivalents as can be included within the spirit and scope of the described embodiments as defined by the appended claims.

Hinged electronic devices can have one or more cables connecting the parts of the devices through or across their hinges. In particular embodiments, the cables include a flex cable and/or a flexible printed circuit board appropriate for transmitting an electrical signal between portions of an electronic device that are connected by a hinge. In the case of a portable computing device (e.g., a laptop computer or notebook computer), one portion of the electronic device may correspond to a lid portion having a display and another portion may correspond to a base portion that includes electronics in communication with the display via the cable(s). The cable(s) can be routed through a hinge region to transmit electrical signals between components within the lid and base portions.

In some embodiments, the cable is drawn over a section of the lid portion referred to as a mandrel or a mandrel portion. The mandrel can be configured to guide the path of the cable and protect the cable from bending beyond a prescribed angle as the lid portion and base portion of the computer pivot relative to each other. The mandrel can have a curved surface to provide smooth movement of the cable and to limit cable bending. This surface can be referred to as a mandrel surface or a cable contacting surface. In some embodiments, the mandrel surface has a constant radius (as measured from the pivot axis) against which the cable is drawn.

In further embodiments, a cover is drawn over the cable in order to prevent the cable from being directly exposed to a user of the electronic device. In some embodiments, the cover can be a flexible sheet or band of material. The cover can therefore be referred to as a flexible band.

The cover materials can have particular physical properties, such as a certain rigidity and resilience that allows for a prescribed movement of the cover and the cable when the electronic device moves between open and closed positions. The cover can also have sufficient durability to withstand wear and tear during the service life of the electronic device. The cover can include multiple layers of material in order achieve these and other desirable physical properties, such as resistance to fluid absorption, ingress, or collection of dried substances. The rigidity of the cover can allow the lid portion to drive the cover into a cavity defined by the base portion of the electronic device. In some embodiments, the cover can be visible to a user of the electronic device.

The cable can be coupled to an electronic component within the base portion of the electronic device. The cable can be attached to electronics such as an integrated circuit or printed circuit board with timing control suitable for driving a display assembly. The cable can be circumferentially routed around a support member located within the base portion in a wrapped configuration. A clip located on the guiding member can secure the cable, isolating one or more sections of the cable that attaches to the electronic component and preventing movement of portions of the cable when the lid portion is rotated relative to the base portion. The other end of the cable can be coupled to an electronic component, such as a display assembly, within the lid portion. In some embodiments, the electronic component in the lid portion can be a touchscreen panel (e.g., a capacitive or resistive touchscreen display), a camera, a light source, an antenna, or another type of electronic component, and the cable can be configured to provide electrical communication between a component of the base portion and the component of the lid portion. Accordingly, the electronic component in the lid portion does not necessarily need to be a display, and the cable can carry signals different from, or in addition to, display driving signals.

The mandrel can be part of a hinge mechanism and can include a cylindrical shaft, a tubular shaft, a pivot and/or swivel mechanism, or a slider mechanism. In some devices, the cable and the curved surface of the mandrel come into close proximity as the electronic device is used, such as when the cable wraps against or otherwise moves into contact with the curved surface. Portions of the mandrel can be positioned lateral to the curved surface, such as portions that are positioned at different points along the pivot axis of the electronic device, and they can be out of contact with, or not covered by, a flex cable or cover.

The devices can also have an opening or gap between the lid and base portions of the housing. The opening or gap can be exposed to the user when the device is opened, such as when the lid portion is rotated to a generally vertical orientation (relative to a generally horizontal orientation of the base portion). The opening or gap can be positioned over the top of the mandrel, cable, and cover. In some cases, debris or liquids can come into contact with the cover, mandrel, or cable in the area of the opening or gap. For example, liquid or other invasive material (e.g., fine dust, gel, and similar substances) that is spilled onto the opening or gap area can adhere to the cover and pass between the cover and at least one of the lid or base portions of the housing.

Liquid in these parts of the device can cause electrical problems, can interfere with the smooth sliding movement of the cover along the base or lid portions of the housing, and can cause visual abnormalities. Fluids, gels, and related substances that have penetrated into the base housing or onto the cover can deposit or build up sticky or chunky residues that can cause the movable components at the hinge area to stick to each other or to the housing in a manner blocking or limiting relative movements between the parts. These issues can make the cover tear, bunch up, rub, or wrinkle as the hinge is operated, thereby potentially exposing the cable underneath the cover to damage or preventing the cover from properly moving relative to the housing.

Accordingly, embodiments of the present disclosure can reduce ingress of liquids or buildup of residual material in the hinge area of the electronic device and on top of the cover of the cable. In some embodiments, a foam barrier can be positioned between the cover and the base portion of the housing to keep water away from the cover and other components within the base portion and to act as a wiping feature configured to thin out fluid material that still passes into the base portion. Channels or protrusions can be added to the surface of the base portion of the housing to reduce contact surface area between the cover and the housing, thereby reducing the amount of area affected by sticky substances on the cover or housing, or to guide or direct fluid on the cover into designated diversion areas or exits from the housing. Coatings or layers of hydrophobic material can be positioned on the cover or housing to facilitate liquid dispersion and to protect the cable. In some embodiments, the cover can be modified to reduce the surface area of the cover that comes into contact with the housing, such as by implementing a cover with a narrow width or by using a cover with a gradually changing width across an area configured to come into contact with the base portion of the housing.

In the description herein, the terms "first portion," "display portion," and "upper housing portion" can refer to a lid portion of a computing device. Generally, a lid portion of a computing device is configured to be in a generally upright position for a user to view a display while the device is being operated. In the description below, the terms "second portion," "base portion," and "lower housing portion" can refer to a base of a computing device that is connected to the lid portion and generally includes connections to devices for user interaction with the computing device. Furthermore, in the description below, the terms "lower housing portion" can be interchangeable with "main housing." As used herein, the parts of a device (or portions of those parts) can be considered "vertically aligned" when they both lie on a common vertical axis and are "directly vertically aligned" when they are both centered on the vertical axis.

These and other embodiments are discussed below with reference to the figures. However, those skilled in the art will readily appreciate that the detailed description given herein with respect to these Figures is for explanatory purposes only and should not be construed as limiting.

FIG. 1 shows a front-facing perspective view of an electronic device 100 in accordance with some embodiments. Electronic device 100 can be a laptop computer, notebook computer, or other similar portable computing device. Electronic device 100 can include a housing having a base portion 102, which can be pivotally connected to a lid portion 104 by way of a hinge assembly within hinge region 106. Lid portion 104 and base portion 102 can be referred to as different sections or portions of a housing of electronic device 100. Lid portion 104 can pivot with respect to base portion 102 with the aid of a hinge assembly within hinge region 106 from a closed position to remain in an open position and back again. In the closed position, the lid portion 104 can be positioned substantially on top of and generally parallel to the top case 114 of the base portion 102.

The lid portion 104 can include a display 108 and a rear housing or rear cover 110. The base portion 102 can include a bottom case 112 that is attached to (e.g., fastened to) a top case 114. The top case 114 can be configured to accommodate various user input devices such as a keyboard 116 and a touchpad 118, which can be configured to receive finger gesturing input from a user. Base portion 102 and lid portion 104 can each define internal chambers or cavities that house internal components of electronic device 100. Thus, lid portion 104 and base portion 102 can function as housings for internal components. Cables, such as flex cables (see FIGS. 2-3), can electrically couple internal components within the base portion 102 and lid portion 104. The cables can provide communication between the internal components within base portion 102 and lid portion 104 and/or provide power to internal components within base portion 102 and/or lid portion 104.

Cable assemblies are described herein that can be used in conjunction with hinged electronic devices, such as electronic device 100. The cable assemblies can include one or more covers that protect and guide the cables during movement of the hinged electronic devices. In some embodiments, the covers are visible to a user of the electronic device when the device is operated (e.g., when it is in an open configuration). For instance, the covers can be visible at the hinge region 106 of the electronic device 100 when it is in an open configuration.

Figure 2:
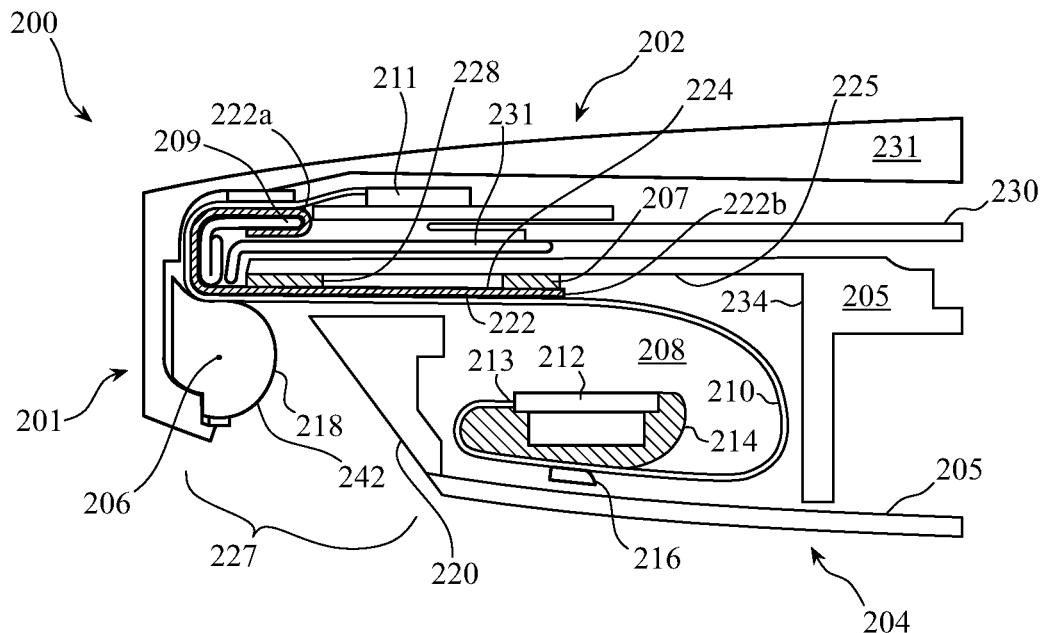
FIG. 2 shows a side section view of a hinge region of a closed computing device of FIG. 1.
Figure 3:
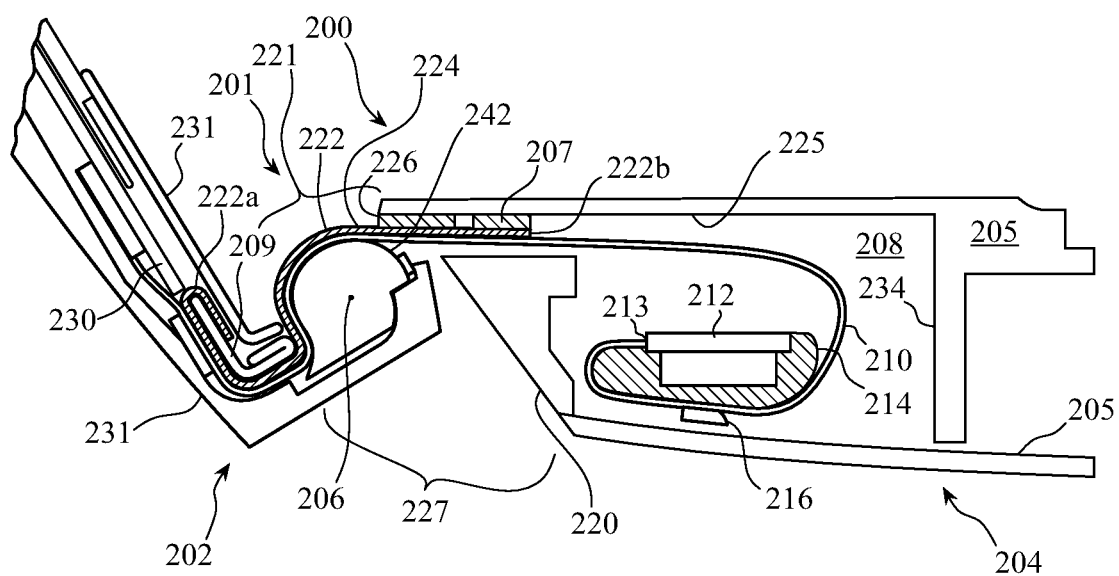
FIG. 3 shows a side section view of the hinge region of FIG. 2 with the computing device in an open configuration as taken through section lines 2-2 in FIG. 1.

FIGS. 2 and 3 show cross-sectional views of a hinged electronic device 200. The section views are taken along section line 2-2 in FIG. 1. FIG. 2 shows a cross sectional view of electronic device 200 in a closed state and FIG. 3 shows a cross sectional view of electronic device 200 in an open state. Electronic device 200 includes a first portion 202 (i.e., first housing portion) coupled to a second portion 204 (i.e., second housing portion). First portion 202 can correspond to a lid portion (or display portion or upper housing portion) and second portion 204 can correspond to a base portion (or lower housing portion) of electronic device 200.

First portion 202 and second portion 204 can share a common axis of rotation with respect to pivot line or pivot axis 206. First portion 202 and second portion 204 can be pivotally coupled to each other via a suitable hinge mechanism. For example, the hinge mechanism can include one or more clutch mechanisms that provide a predetermined resistance to opening and closing forces applied by a user and by the weight of the portions 202, 204 of the electronic device 200. The exact hinge mechanism may vary depending on design requirements. The general region around pivot axis 206 can be referred to as a hinge region 201 of electronic device 200.

Electronic device 200 can include a cable 210 to provide electrical communication between first portion 202 and second portion 204. For example, cable 210 can provide electrical connection between electronic component 211 of first portion 202 and electronic component 212 of second portion 204. Electronic component 211 can be in electrical communication with display assembly 230, which is mounted to first housing 231. Display assembly 230 can include any suitable type of display for use in electronic device 200, such as a liquid crystal display (LCD) and/or organic light-emitting diode (OLED) screen. The first housing 231 and its attached or integral components (e.g., display assembly 230 and mandrel 218) can be referred to as a first housing assembly.

Electronic component 212 can include an integrated circuit (IC) and/or a printed circuit board (PCB), and can include a timing control mechanism configured to drive display assembly 230. Electronic component 212 is housed within cavity 208 defined at least partially by second housing 205 with a front wall 234. In some embodiments, cable 210 provides power from a battery or other power source (not shown) within second housing 205 to display assembly 230. The second housing 205 and its attached components (e.g., electronic component 212 or the battery) can be referred to as a second housing assembly. The first and second housing assemblies are movably connected to each other at the hinge region 201. The cable 210 can be connected to the electronic component 212 at a connection point 213 and can wrap around an internal support structure 214 within the cavity 208 of the second housing 205. A clip 216 can be used to keep portions of the cable 210 from falling out of contact with the surface of the support structure 214, thereby limiting stress at the connection point 213.

Cable 210 can be any suitable type of cable, including a flex cable, a flexible printed circuit board, or any suitable mechanism for transmitting an electrical signal between the portions 202 and 204. In some embodiments the cable 210 is a ribbon-like, single-layer flex cable, however a multiple-layered flex cable can be used. A single-layer flex cable 210 can be used to reduce the stack height (i.e., vertical thickness) of the cable 210 and to improve its flexibility. Electronic device 200 can include any suitable number of cables 210. In a particular embodiment, electronic device 200 includes two cables 210 that are laterally spaced apart along the pivot axis 206.

The cable 210 can be directly routed between first portion 202 and second portion 204 without passing through a clutch mechanism and without passing through the pivot axis 206. The cable 210 and cover 222 can both be positioned on a user side of the pivot axis 206 (i.e., the right side of FIGS. 2-3) when the user opens the device 200. Thus, a number of mechanisms can be used to guide the movement of cable 210 when first portion 202 is pivoted with respect to second portion 204. For example, hinge region 201 can include mandrel 218 which can be in the form of a cylinder-like portion of first portion 202 that extends along the pivot axis 206.

When electronic device 200 is moved from a closed state in FIG. 2 to an open state in FIG. 3, the cable 210 is drawn over a curved surface 242 of mandrel 218 to keep cable 210 from buckling or folding. The curved surface can be referred to as a mandrel surface, a cable support surface, a cable-contacting surface, a cable-facing surface, an outer hinge surface, a cable-bend-limiting surface, or a curved mandrel surface. A portion of the cable 210 can take on a curved shape with a curvature similar to the curved surface of mandrel 218 when electronic device 200 is rotated to an open configuration, as shown in FIG. 3.

The curved surface of mandrel 218 can have a radius defined with respect to a pivot axis 206 (i.e., an axis of rotation of the hinge region 201). The radius can be constant for the curved surface where the cable 210 contacts mandrel 218. In some embodiments, the surface of mandrel 218 is segmented to correspond to sections of the flex cable 210.

Referring to FIG. 3, when the electronic device 200 is in an open state, a cover 222 (e.g., flexible band) can be used to conceal and protect a top side of cable 210 between the portions 202, 204 at an upper opening or gap 221 between the portions 202, 204 in the hinge region 201. The surface of the cable 210 contacting the cover 222 can be referred to as a cover-facing surface, a top surface, a user-exposed surface, or a user-facing surface. That surface is positioned on the cable 210 opposite a mandrel-facing surface of the cable 210.

The cover 222 can be flexible, and can therefore, like cable 210, take on a curved shape around the mandrel 218 when electronic device 200 is rotated to an open configuration, as shown in FIG. 3. The cover 222 can comprise a top surface or upward-facing surface 224, a first end 222a, and a second end 222b. The first end 222a can be fixed in place within and relative to the first portion 202 by an anchor 209. The second end 222b can be movable relative to the second portion 204 as the cover 222 wraps around the cable 210 and mandrel 218.

Figure 4:
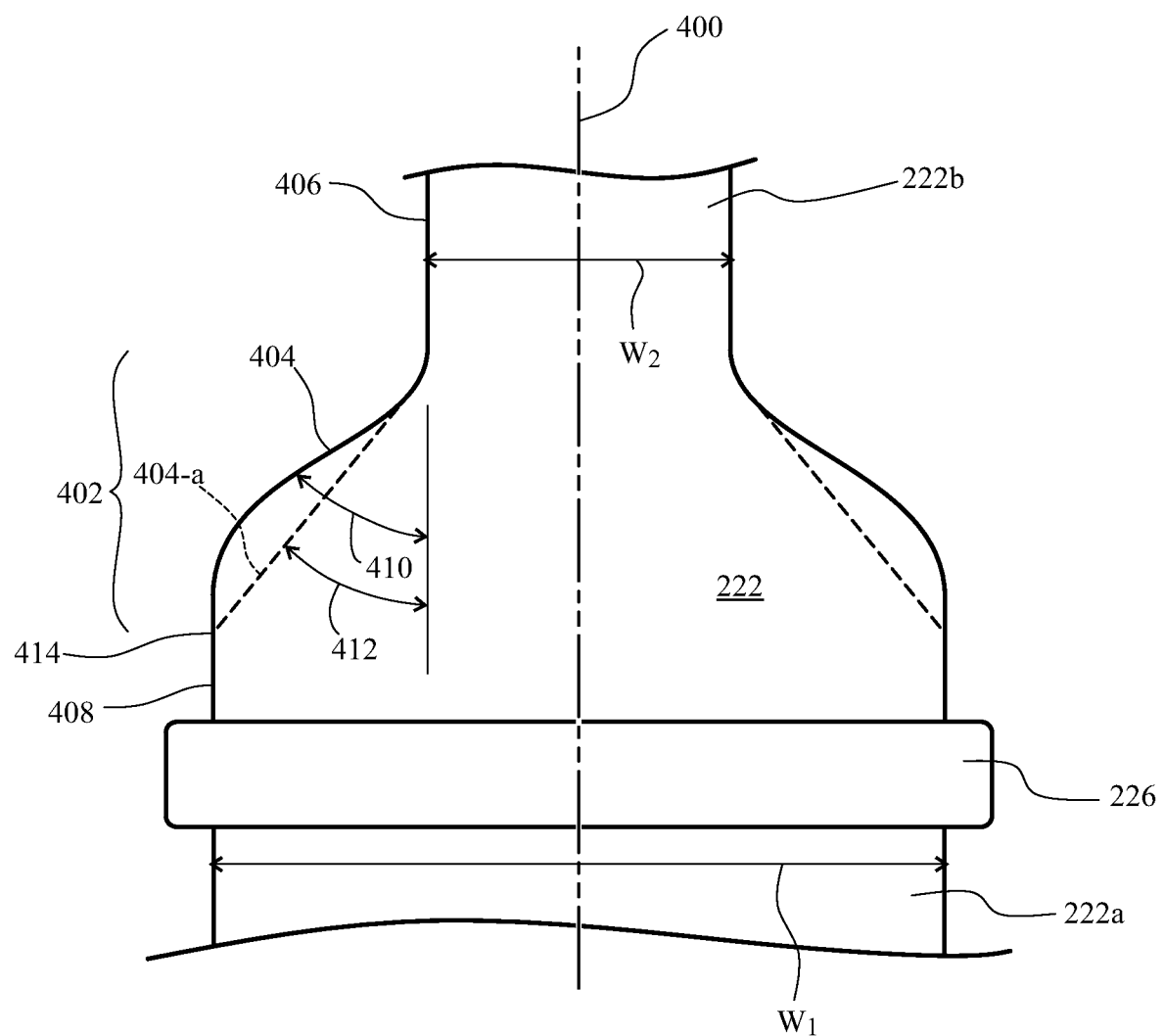
FIG. 4 shows a top view of a flexible cable cover and a barrier.

FIG. 4 is a partial top view of the cover 222 that is shown separated from the first and second portions 202, 204. The second end 222b of the cover 222 can move relative to the second portion 204 of the device 200, as shown by comparing FIGS. 2 and 3. The second end 222b can be attached to a biasing mechanism configured to apply a force pulling on the second end 222b in a longitudinal direction (i.e., along the longitudinal axis 400). See biasing mechanism 540 or 640 of FIGS. 5-6.

The top surface 224 can face a downward-facing surface or inner surface 225 of the second housing 205 of the second portion 204. Invasive materials such as liquids and fine debris that fall onto the cover 222 at the gap 221 and that pass between the downward-facing surface 225 of the second housing 205 and the top surface 224 of the cover 222 can penetrate into the cavity 208 and damage or interfere with the operation or movement of the cover 222, cable 210, electronic component 212, and other sensitive parts in or on the second portion 204. Accordingly, in some embodiments, at least one barrier 207, 226 (i.e., a barrier device, wall, or blocking portion) can be provided between the cover 222 and the downward-facing surface 225 in order to restrict and limit the size of any openings through which the liquid or fine debris can pass between the cover 222 and the downward-facing surface 225. Barriers 207, 226 can also be used to wipe or sweep clear the top surface 224 or downward-facing surface 225 when liquid or fine debris collects on either surface 224, 225. In some embodiments, the barriers 207, 226 can thin out, redirect, or spread the liquid or other debris that comes in contact with the cover 222 and barriers 207, 226.

For example, barrier 207 can be affixed to the top surface 224 and can move with the second end 222b of the cover 222 relative to the downward-facing surface 225 while contacting the downward-facing surface 225. Accordingly, any droplets, dust, or other intrusive material on the downward-facing surface 225 can be wiped or swept away from the downward-facing surface 225 by the barrier 207 as it slides along the downward-facing surface 225. Any invasive material on the top surface 224 can also be prevented from moving past the second end 222b when coming into contact with the barrier 207. The wiping or sweeping of the material between the top surface 224 and the downward-facing surface 225 can drive the material out of the second portion 204 and through gap 221 (see FIG. 3), especially as the first portion 202 and second portion 204 are repeatedly cycled between closed and open positions (i.e., between the positions shown in FIGS. 2 and 3). Thus, implementing the barrier 207 can help reduce the amount of contaminants that pass into or remain in the cavity 208. The barrier 207 can be referred to as a cover-mounted barrier or cover-mounted blocking member.

Barrier 226 can be affixed to the downward-facing surface 225 while contacting the top surface 224. Accordingly, barrier 226 can also be used to wipe or sweep material from the top surface 224 as the first and second portions 202, 204 are cycled between closed and open positions as the barrier 226 slides in contact with the top surface 224. Barrier 226 can also help block material from entering the cavity 208 via the gap 221 by reducing the size of the opening between the downward-facing surface 225 and the top surface 224. The positioning of barrier 226 immediately adjacent to the gap 221 can thereby help limit the amount of debris or liquids at the gap 221 that can pass between the top surface 224 and downward-facing surface 225. The barrier 226 can be referred to as a housing-mounted barrier or housing-mounted blocking member.

The barriers 207, 226 can be used simultaneously or independently on an electronic device 200. Thus, in some cases, the electronic device 200 comprises a single barrier 207 or 226, and in some cases, both barriers 207, 226 are used. In some embodiments, the relative positioning of the barriers 207, 226 can be reversed, wherein barrier 226 is positioned further within the cavity 208 relative to the gap 221 than barrier 207.

As shown in FIGS. 2-3, the top surface 224 can be spaced away from and out of contact with the entire downward-facing surface 225 by the barriers 207, 226. In some embodiments, a portion of the top surface 224 contacts the downward-facing surface 225 and a portion of the top surface 224 is spaced away from the downward-facing surface 225. In this case, the portion spaced away from the downward-facing surface 225 can be adjacent to and adjoining a barrier 207, 226. Spacing the top surface 224 away from the downward-facing surface 225 can help reduce friction between the surfaces 224, 225 and can reduce adhesion between the surfaces 224, 225, especially in cases where a sticky substance moves between the surfaces 224, 225 (e.g., a sugary drink or a tacky dried residue thereof).

The barriers 207, 226 can comprise a hydrophobic material. Materials used in the barriers 207, 226 can include polymers such as polyethylene terephthalate (PET) or thermoplastic polyurethane (TPU), adhesive materials configured to attach the barriers 207, 226 to surfaces 224, 225, compressible material such as foam, rubber, or elastic polymer configured to resiliently deform in response to contact with the surfaces 224, 225 or debris between the surfaces. Use of resilient materials can help ensure constant contact between the barriers 207, 226 and the surfaces 224, 225.

As shown in FIG. 4, the cover 222 can comprise a first end 222a having a first width $W_1$ measured perpendicular to the longitudinal axis 400 and a second end 222b having a second width $W_2$ measured perpendicular to the longitudinal axis 400, with the second width being less than the first width. The longitudinal axis 400 can be the axis of motion of the cover 222, wherein the cover 222 can move along the longitudinal axis 4000 relative to the second portion 204, as shown in FIGS. 2-3.

The first end 222a of the cover 222 can have an enlarged width relative to the width of the second end 222b. The second end 222b can be retained by a reel or other biasing mechanism positioned in the second portion 204, and the reduced width $W_2$ can correspond to a width of the biasing mechanism while the width $W_1$ corresponds to the width of the cable 210 measured laterally perpendicular to the longitudinal axis 400. Accordingly, the width $W_1$ can cover the entire width of the cable 210 where the cover 222 contacts the cable 210, and width $W_2$ can cover less than the entire width of the cable 210. The cover 222 can be elongated along the direction of the longitudinal axis 400, and barrier 207 or 226 can be elongated along a direction perpendicular to the longitudinal axis 400. The barrier 207 or 226 can have an elongated width that is greater than the maximum lateral width of the cover 222 (e.g., $W_1$), as shown in FIG. 4.

In some embodiments, the cover 222 transitions between width $W_1$ and width $W_2$ at a transition portion 402 of the cover 222. The transition portion 402 can have a transition surface 404 positioned between parallel sides 406, 408 of the cover 222. The transition surface 404 can be oriented at an angle 410 between about 50 degrees and about 90 degrees relative to the longitudinal axis 400. In some embodiments, the cover 222 transitions between the widths at a transition portion 402 having a transition surface 404-a oriented at an angle 412 between about 5 degrees and about 40 degrees relative to the longitudinal axis 400. Accordingly, the length of the transition surface 404-a is greater than the length of transition surface 404, and the transition between the widths $W_1$, $W_2$ occurs over a greater longitudinal length of the cover 222. Additionally, the surface area of the transition portion 402 with transition surface 404-a is less than the surface area of transition portion 402 with transition surface 404. The reduced surface area can reduce the possibility for material to be trapped between the cover 222 and the cable 210 at the transition portion 402, so it is less likely for the cover 222 to adhere to, bind with, or grind against the cable 210. Additionally, using a cover 222 with the reduced surface area can allow debris to have more room between the cable 210 and the downward-facing surface 225 if goes past the cover 222, thereby limiting stresses on the cable 210 that would otherwise be applied to the cable 210 if the cover 222 had a larger surface area.

The transition surface 404-a can extend along a length of the cover 222 that remains covered by the second housing 205 (i.e., not exposed in the gap 221) when the electronic device 200 is in the open configuration. In some embodiments, the end 414 of the transition surface 404-a that is closest to the first end 222a can be positioned vertically above and vertically aligned with a portion of the mandrel 218, vertically above and vertically aligned with a blocking member 220 of the second portion 204, or vertically below and vertically aligned with barrier 226 when the electronic device 200 is in the open configuration. The transition portion 402 of the cover 222 can remain in a linear and relatively unbent, non-curved configuration when the electronic device 200 is in the open configuration. In this manner, the narrowed width at the end 414 of the transition surface 404-a does not expose the cable 210 when the device 200 is opened.

In some embodiments, an amount by which the cover 222 bends can be inversely related to the angle between the first portion 202 and the second portion 204. In some examples, the curved surface of mandrel 218 can exert a greater amount of a bend (in a single direction) on the cover 222 when the first portion 202 is pivoted relative to the second portion 204 by an angle of less than 90 degrees in contrast to when the angle between the first portion 202 and the second portion 204 is pivoted to greater than 90 degrees. In other words, as the angle between the first portion 202 and second portion 204 decreases and the electronic device 200 becomes progressively closer to being characterized as having a closed configuration, the amount of the cover 222 retracted into the second portion 204 can increase. In some embodiments, the first portion 202 and the second portion 204 can be pivoted relative to each other according to an angle between about 0 degrees to about 200 degrees.

Figure 5:
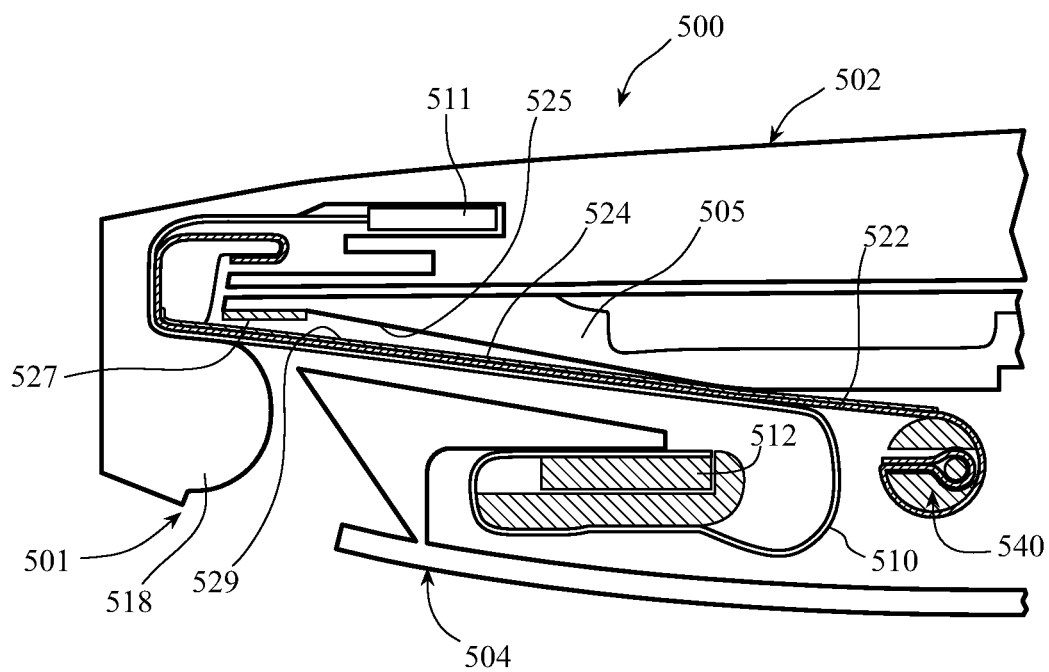
FIG. 5 shows a side section view of a hinge region of another embodiment of a computing device.

In some embodiments, a section of the cover 222 is mechanically captured by the second portion 204 (e.g., using biasing mechanism 540 of FIG. 5). In some embodiments, a section of the cover 222 is mechanically captured by the first portion 202 (e.g., using the anchor 209). "Mechanically captured" can refer to enclosing or containing the section of the cover 222 by at least one of an enclosure, a tensioning mechanism, a hook, or a castellation of either the first portion 202 or the second portion 204 in a manner preventing complete withdrawal or separation of the section of the cover 222 from the feature that is mechanically capturing it.

First end 222a of cover 222 can be positioned within first portion 202 of electronic device 200 and second end 222b of cover 222 can be positioned within second portion 204 of electronic device. Since cover 222 can be exposed, it can be made with a material that is durable enough to withstand wear and tear that can be accompanied with direct exposure to a user. For example, cover 222 may encounter objects inserted or dropped within the gap 221 at hinge region 201. Cover 222 can also be flexible enough to bend with cable 210 when electronic device 200 transitions between open and closed states. Cover 222 and mandrel 218 can be designed to have a particular aesthetic appearance, such as each having the same or different colors, or each having the same or different surface finishes.

Additionally, the material for cover 222 can affect how the cover 222 moves during the opening and closing of electronic device 200. For example, cover 222 can have an inherent rigidity and resilience that generates a resistance force when cover 222 is bent over mandrel 218 when electronic device 200 moves from closed (FIG. 2) to open (FIG. 3) position. This resistance force can cause cover 222 to return to its original shape when electronic device 200 is returned to a closed (FIG. 2) position. This way, cover 222 will not crease or buckle at hinge region 201. If cover 222 is made of a material that is not sufficiently rigid, it can crease or wrinkle at hinge region 201.

The rigidity of cover 222 can also at least partially dictate the movement of cable 210. For example, the side of cover 222 that is exposed to a user can be constrained near first end 222a by anchor 209 and near second end 222b by barrier 207. Anchor 209 and barrier 207 can act as retention features that keep cover 222 from shifting out of place and keep the cover 222 over cable 210 when the electronic device 200 rotates between closed and open positions.

In some embodiments, anchor 209 is made of a stiff material, such as a metal material (e.g., steel). First end 222a can be coupled to anchor 209 using, for example, adhesive and/or fastener(s) such as one or more screws. In some embodiments, barrier 207 and barrier 226 can include a low friction material, such as a fluoropolymer material (e.g., polytetrafluoroethylene or TEFLON™), that enables cover 222 to slide freely during opening and closing of electronic device 200. In other words, second end 222b can be untethered and free to move with respect to cable 210 and barrier 226. The second end 222b can therefore be free to slide along the top surface 224 of the cable 210 and within the second housing 205 without binding to the housing 205. Barrier 207 can contact lip 228 (see FIG. 2) of barrier 226 at an inner surface of cavity 208 to retain second end 222b within cavity 208. Lip 228 can be an integrally formed portion of second housing 205, or it can be a separate piece that is coupled to the inner surface of cavity 208, such as part or surface of barrier 226.

In some embodiments, electronic device 200 has a ventilation gap 227 suitable for providing air flow in and out of cavity 208 and cooling electronic component 212 and other components housed within cavity 208. Ventilation gap 227 is positioned near hinge region 201 between first portion 202 and second portion 204 of electronic device 200. Depending on cooling requirements, ventilation gap 227 can have a size sufficiently large enough to allow access to components within cavity 208, including the cable 210, when electronic device 200 is in a closed position. Blocking member 220 (i.e., the vent opening wall or housing barrier) can be used to limit access to cavity 208. Blocking member 220 can an integral part of second housing 205 or a separate piece that is coupled to second housing 205 as part of second portion 204. In some embodiments, blocking member 220 is coupled to an inner surface within cavity 208 proximate ventilation gap 227. Blocking member 220 can have provisions such as through-holes or apertures to allow for further ventilation of cavity 208.

As shown, cable 210 and cover 222 can be routed between blocking member 220 and lip 228 as the cable 210 and cover 222 exit second housing 205. In some embodiments, the barriers 207, 226 can be configured to sweep or wipe liquids or other fine debris from the top surface 224 of the cover 222 or the downward-facing surface 225 of the second housing 205 laterally relative to the cover 222 or cable 210 and toward or through the ventilation gap 227.

The cover 222 can be made of a sufficiently flexible material to allow bending of the cover 222 over the cable 210 and the mandrel 218 during opening of electronic device 200. The cover 222 can also be rigid and resilient enough to provide a resistance force to the bending such that the cover 222 returns to its original configuration when electronic device 200 is closed again. For example, the section of cover 222 between gap 221 and barrier 207 can return to a substantially flat shape when electronic device 200 is returned to a closed state (as shown in FIG. 2). In some embodiments, cover 222 is non-electrically conductive to prevent cover 222 from electrically interfering with internal components of electronic device 200. In some embodiments, cover 222 is made of a single sheet of material, such as a composite fiber material. For example, cover 222 can be made of a single sheet of glass and/or carbon fiber material embedded within or infused with a polymer, such as polyurethane. In some embodiments, cover 222 is a laminated sheet that includes layers of different materials. In some embodiments, cover 222 is a laminated sheet that includes multiple layers of the same material.

FIG. 5 shows a side section view of an alternative embodiment of an electronic device 500 in which a first housing portion 502 is connected to a second housing portion 504 at a hinge portion 501. Elements of the electronic devices 200, 500 having similar names and numbering are configured to perform similar functions. A cable 510 can connect electronic components 511, 512, and a cover 522 can be positioned above the cable 510 at the hinge portion 501 and within the second housing portion 504. The second housing portion 504 can comprise an inner, downward-facing surface 525 that faces a top or upward-facing surface 524 of the cover 522. The top surface 524 and downward-facing surface 525 can each comprise portions 527, 529 thereof that each include a hydrophobic material or a hydrophobic layer.

The hydrophobic portion 527 of the downward-facing surface 525 can be positioned at an opening between the downward-facing surface 525 and the mandrel 518. In other words, the portion 527 can face the mandrel 518 and can be positioned vertically aligned with the mandrel 518. An edge of the portion 527 can adjoin a vertically-oriented surface of the second housing 505 at the opening. The hydrophobic portion 527 can be positioned entirely above and vertically aligned with the mandrel 518. The portion 527 can be positioned over the rear-most portion of the cover 522 that is under the second portion 504, wherein the rear direction extends rearward of the first portion 502 when the electronic device 500 is in an open configuration (i.e., directed toward the left side of FIG. 5) or wherein the rear direction extends away from the biasing mechanism 540 connected to the cover 522 and toward the hinge portion 501. The hydrophobic portion 527 can face or contact the hydrophobic portion 529 of the cover 522.

The cover 522 and cable 510 can extend through the opening between the mandrel 518 and the downward-facing surface 525. Because it is positioned at the opening, the hydrophobic portion 527 can limit, repel, or inhibit liquids at the opening and keep them from passing between the top surface 524 and downward-facing surface 525. Similarly, the hydrophobic portion 529 of the cover 522 can limit, repel, or inhibit liquids at the opening and across the top surface 524 of the cover 522. In some embodiments, the liquids can be redirected away from the opening between the surfaces 524, 525, such as by being redirected laterally across the electronic device 500 (i.e., parallel to the pivot axis of the hinge portion 501). In some embodiments, the liquids can be collected into a section of the hinge portion 501 that is visible to the user during normal operation of the electronic device 500 so that the user can conveniently observe and remove the unwanted invasive material.

The biasing mechanism 540 can comprise a biasing member (e.g., a coil spring or similar retractor) configured to apply a biasing force to the cover 522 that pulls the cover 522 toward the biasing mechanism 540. The biasing force can be overcome as the electronic device 500 is opened, and the biasing force can ensure retraction of the cover 522 into the second portion 504 as the electronic device 500 is closed.

As the electronic device 500 transitions to the closed configuration from an open configuration, fluid on the top surface 524 of the cover 522 can be moved from the top surface 524 before passing underneath the hydrophobic portion 527 of the downward-facing surface 525. The hydrophobic portions 527, 529 can comprise a low surface tension and low friction material so that fluids are discouraged from remaining on the cover 522 as it retracts into the second portion 504. Additionally, the hydrophobic portions 527, 529 can be configured to contact each other as the cover 522 is retracted, thereby reducing the available space for fluids or debris to pass between the downward-facing surface 525 and the top surface 524. The hydrophobic portions 527, 529 can comprise materials such as fluoropolymer material (e.g., polytetrafluoroethylene) which has low friction. In some embodiments, the hydrophobic portions 527, 529 can comprise rubber or a material with low-friction surface properties.

Figure 6:
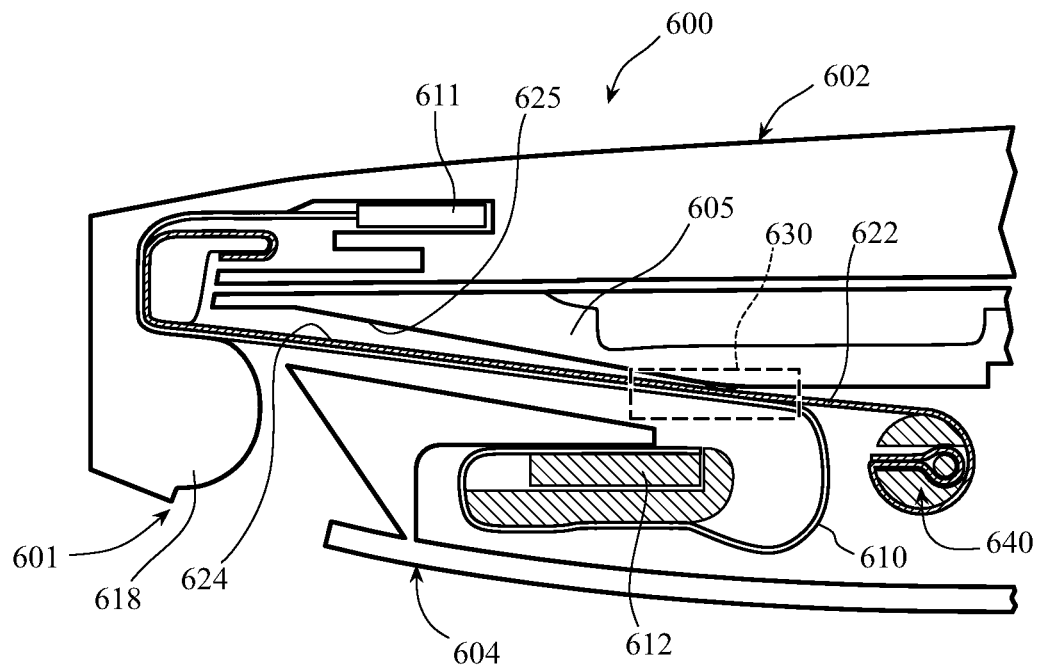
FIG. 6 shows a side section view of a hinge region of another embodiment of a computing device.

FIG. 6 shows a side section view of an alternative embodiment of an electronic device 600 in which a first housing portion 602 is connected to a second housing portion 604 at a hinge portion 601. Elements of the electronic devices 200, 500, and 600 having similar names and numbering are configured to perform similar functions. A cable 610 can connect electronic components 611, 612, and a cover 622 can be positioned above the cable 610 at the hinge portion 601 and within the second housing portion 604. The second housing portion 604 can comprise an inner, downward-facing surface 625 that faces a top or upward-facing surface 624 of the cover 622.

The downward-facing surface 625 can comprise a region 630 within which the surface 625 comes into contact with the top surface 624 of the cover 622. FIGS. 7-14 show various different embodiments of the downward-facing surface 625 at region 630.

Figure 7:
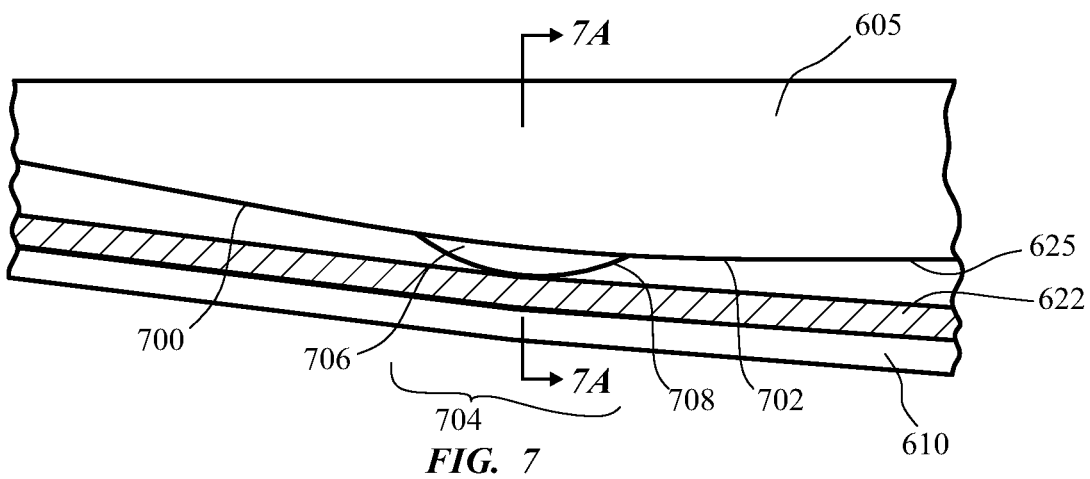
FIG. 7 shows a side section view of an embodiment of the device of FIG. 6.
Figure 7A:
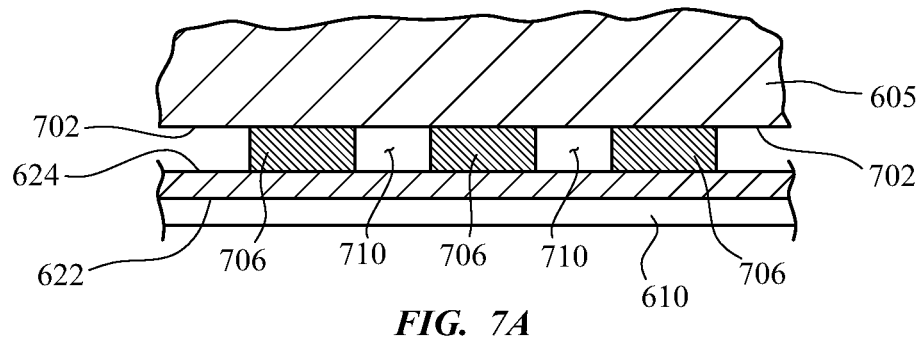
FIG. 7A shows a front section view of the device of FIG. 7 as taken through section lines 7A-7A in FIG. 7.
Figure 8:
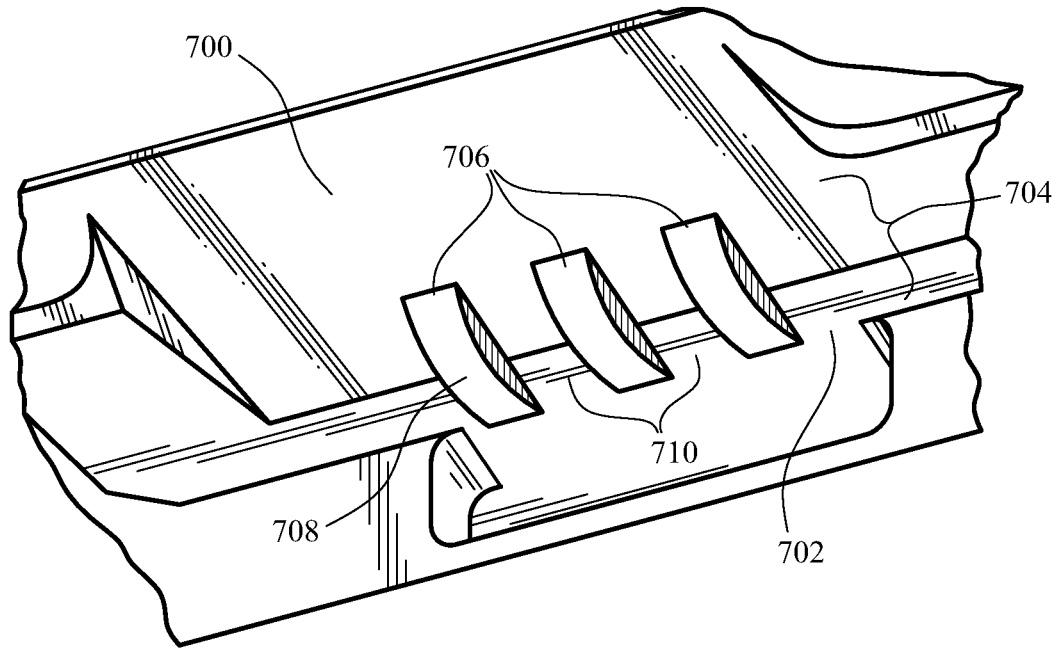
FIG. 8 shows a perspective view of a downward-facing surface of a housing of the device of FIG. 7.

As shown in FIGS. 7, 7A, and 8, the region 630 can comprise a first angled portion 700 and a second angled portion 702, wherein the first and second angled portions 700, 702 are oriented at different angles relative to a vertical direction. In the example shown in FIG. 7, the first angled portion 700 is about 80 degrees offset from the vertical direction, and the second angled portion 702 is about 90 degrees offset from the vertical direction. In this manner, a transition portion 704 is formed where the first and second angled portions 700, 702 intersect. The transition portion can be a local minimum formed by the first and second angled portions 700, 702 and can be referred to as a slope transition section or raised/elevated edge of the downward-facing surface 625 adjoining and between the first and second angled portions 700, 702.

In the embodiment of FIGS. 7-8, the transition portion 704 of the downward-facing surface 625 comprises a set of protrusions 706 extending downward from the first and second angled portions 700, 702 of the downward-facing surface 625. The protrusions 706 can extend downward from the first and second angled portions 700, 702 and can space the angled portions at least partially out of contact with the cover 622, as shown in FIG. 7. Thus, the cover 622 can have a first portion of the top surface 624 positioned out of contact with the downward-facing surface 625 and a second portion of the top surface 624 positioned in contact with the downward-facing surface 625 (at the transition portion 704).

The protrusions 706 can be a local minimum or transition edge of the downward-facing surface 625. As used herein, a "transition edge" can comprise a sharp, well-defined edge (such as defined edge 906 (see FIGS. 9-10 and their descriptions below)), or it can be comprise a local inflection surface of the downward-facing surface 625 with lower curvature at the transition portion 704 where the slope of two surface portions (e.g., 700, 702) changes, such as the rounded bottom surface of the protrusions 706. A "raised edge" can comprise an edge or shape of the downward-facing surface 625 that locally protrudes or is elevated in a direction perpendicular to an average plane of its adjacent side surfaces.

The protrusions 706 can have smoothly curved bottom surfaces (e.g., 708) that contact the cover 622 in order to reduce pressure and friction against the cover 622. Spacing the cover 622 away from the downward-facing surface 625 can reduce the surface area of the top surface 624 that comes into contact with the downward-facing surface 625 and can thereby reduce friction and the potential for liquids and other intrusive materials to be positioned in contact with, and potentially adhering, binding, or otherwise increasing the friction between both of the surfaces 624, 625. Accordingly, the protrusions 706 can reduce binding or adhesion between surfaces 624 and 625.

A set of multiple protrusions 706 can be laterally spaced apart (i.e., along a direction parallel to the pivot axis (i.e., 206)) to create gaps 710 or channels between the protrusions 706. The gaps 710 can therefore have top surfaces spaced away from the cover 622. In this manner, the gaps 710 can be channels through which liquids or debris can pass from a position beneath the first angled portion 700 to a position beneath the second angled portion 702 which is past the protrusions 706 relative to the opening (e.g., 221) of the device.

A gap 710 can be vertically aligned with a first portion of the cover 622, and a protrusion 706 can be vertically aligned with a second portion of the cover 622 that is laterally adjacent to the first portion (i.e., along the pivot axis 206). The electronic device 600 can also include features to remove that passing liquid or debris from a location that would interfere with operation of the cover 622 or cable 610. The inclusion of gaps 710 can therefore reduce the amount of material that can collect or can be trapped between the first angled portion 700 and the top surface 624 of the cover 622. Material contacting the protrusions 706 can be urged to pass under the gaps 710 when the cover 622 slides relative to the protrusions 706 and frees the debris or removes dried material from the cover 622 or protrusions 706. Accordingly, the top surface 624 of the cover 622 can be slidable against the transition edge (i.e., raised edge or local minimum) of the downward-facing surface 625. A first portion of the cover 622 can be under a protrusion 706, and a second portion of the cover 622 can be laterally adjacent to the first portion and under a gap 710.

The gaps 710 can alternatively be referred to as apertures positioned between the downward-facing surface 625 and the cover 622. FIG. 7A shows a front-facing section view taken through section lines 7A-7A in FIG. 7 wherein the gaps 710 are shown located between the second housing 205 and the cover 622. Each of the gaps 710 can therefore make an aperture having a perimeter including a top surface (i.e., part of first or second angled surfaces/surface portions 700/702), a bottom surface (i.e., the top surface 624 of the cover 622), and two side surfaces (i.e., the sidewalls of adjacent protrusions 706). As shown in FIG. 7A, the gaps 710 can each have a generally rectangular perimeter shape. The apertures can have longitudinal axes aligned with the longitudinal axis 400 of the cover 622, wherein particles and fluid can pass through the apertures along the longitudinal axes of the apertures. FIG. 7A shows two apertures. In some cases, more or fewer apertures can be formed based on the number and shape of the protrusions 706.

Figure 9:
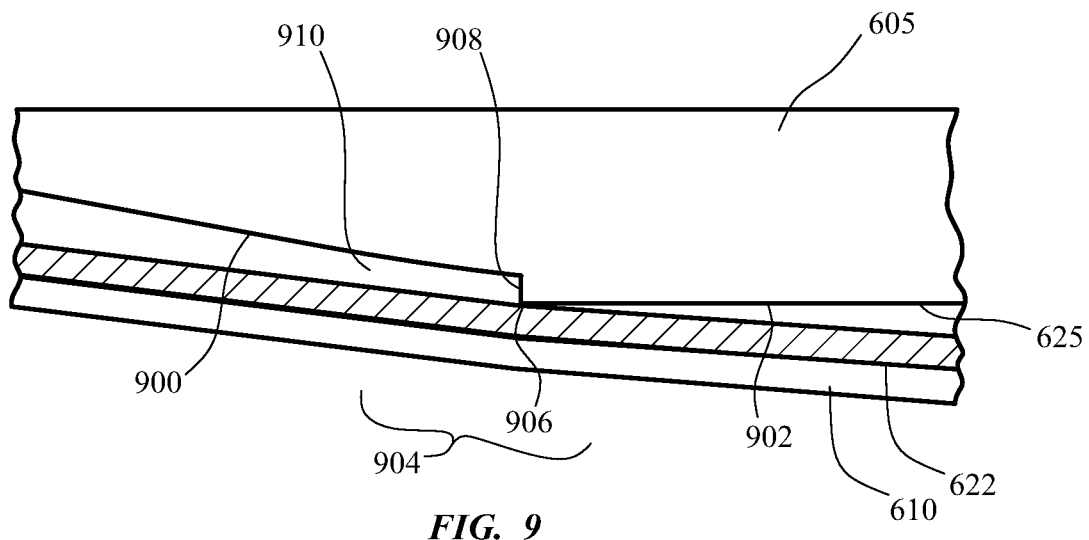
FIG. 9 shows a side section view of another embodiment of the device of FIG. 6.
Figure 10:
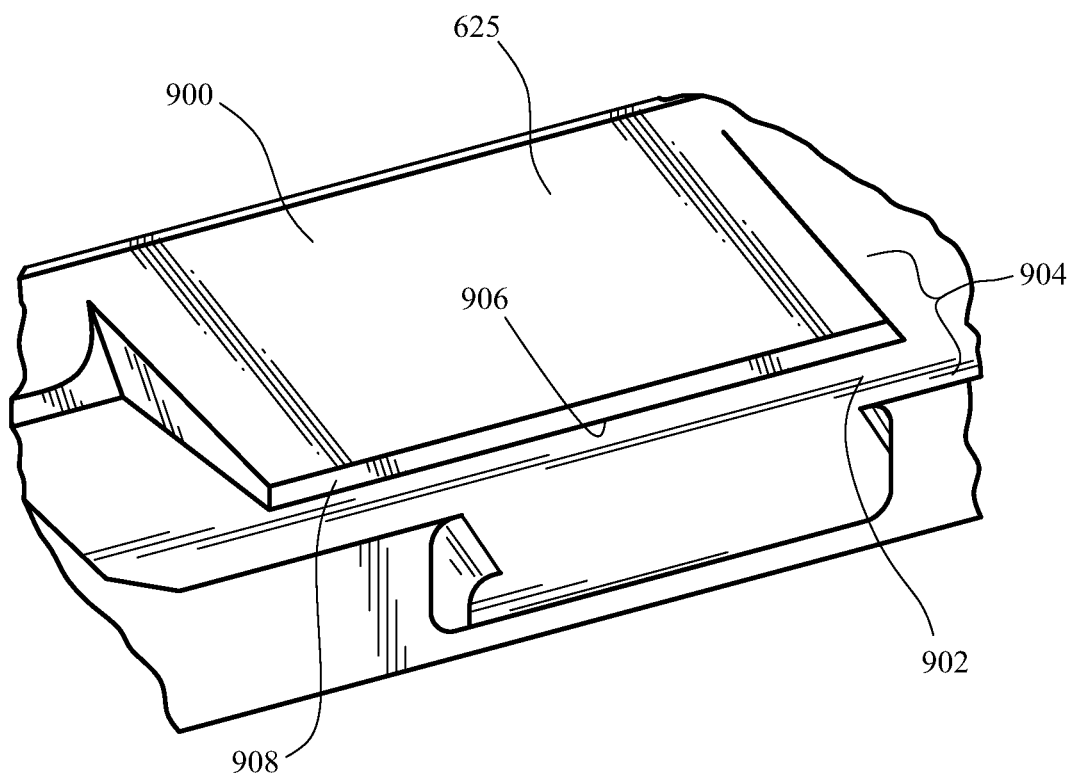
FIG. 10 shows a perspective view of a downward-facing surface of the housing of the device of FIG. 9.

FIGS. 9-10 show a side view and orthogonal view of the region 630 of an alternative embodiment of the downward-facing surface 625 of the electronic device 600. The downward-facing surface 625 can comprise a first angled portion 900 and a second angled portion 902, wherein the first angled portion 900 ends at a third angled portion 908 (e.g., a substantially vertical surface) that connects to the second angled portion 902. The third angled portion 908 vertically spaces the end of the first angled portion 900 away from the second angled portion 902, and the cover 622 is therefore spaced away from the first angled portion 900 near the third angled portion 908. The second and third angled portions 902, 908 can come together at a downward-extending edge 906 that is configured to contact the cover 622. The angles of the first and second angled portions 900, 902 can ensure that the downward-facing surface 625 only comes into contact with the cover 622 at the downward-extending edge 906. The downward-extending edge 906 can be referred to as a ridge or elongated protrusion located between the first and second angled portions 900, 902.

As shown in FIG. 10, the downward-extending edge 906 can have a consistent height extending across the entire lateral width of the cover or across the entire transition portion 904 between the first and second angled portions 900, 902. Accordingly, no individual part of the edge 906 can be configured to concentrate pressure against the cover 622, and the support of the cover 622 by the edge 906 can be distributed evenly across the entire width of the edge 906 or the entire width of the cover 622. The downward-extending edge 906 can also have a lateral width that is greater than the maximum lateral width of the cover 622 (or greater than the lateral width of the cover 622 where the cover 622 contacts the edge 906). The width of the edge 906 relative to the width of the cover 622 can be similar to the ratio of the width of the barrier 226 to the cover 222 in FIG. 4.

The third angled portion 908 can also be beneficial as a wall or contaminant blocking surface, wherein liquids or other debris that passes between the cover 622 and the downward-facing surface 625 that travels along the top surface 624 of the cover 622 can be prevented from moving beneath the second angled surface 902 and can be trapped in a cavity 910 (see FIG. 9) formed between the first angled surface 900 and the cover 922 and rearward of the third angled surface/surface portion 908. Small contaminants that pass into that cavity 910 can be prevented from penetrating further into the electronic device 600 where more sensitive components are potentially positioned.

Figure 11:
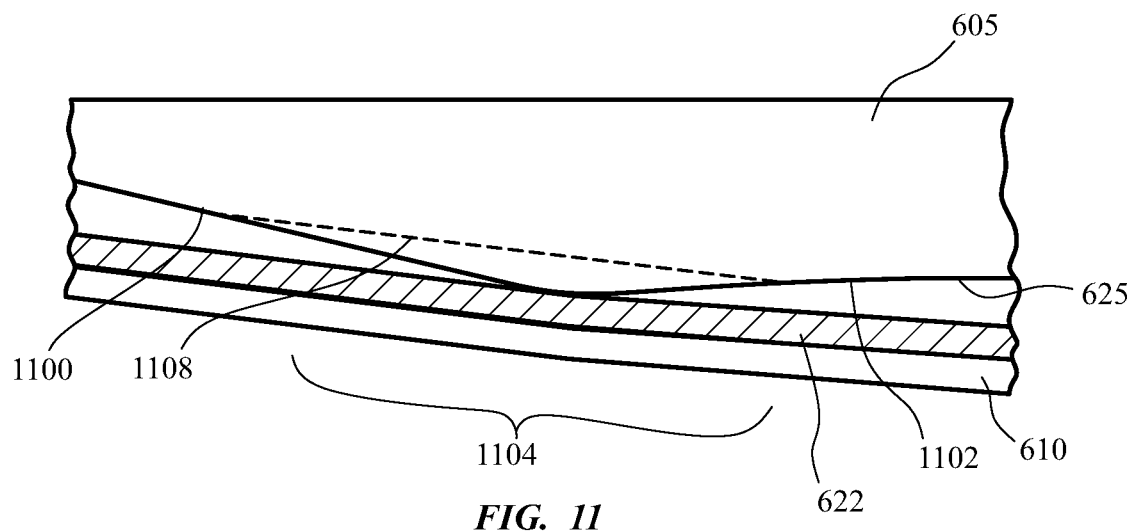
FIG. 11 shows a side section view of another embodiment of the device of FIG. 6.
Figure 12:
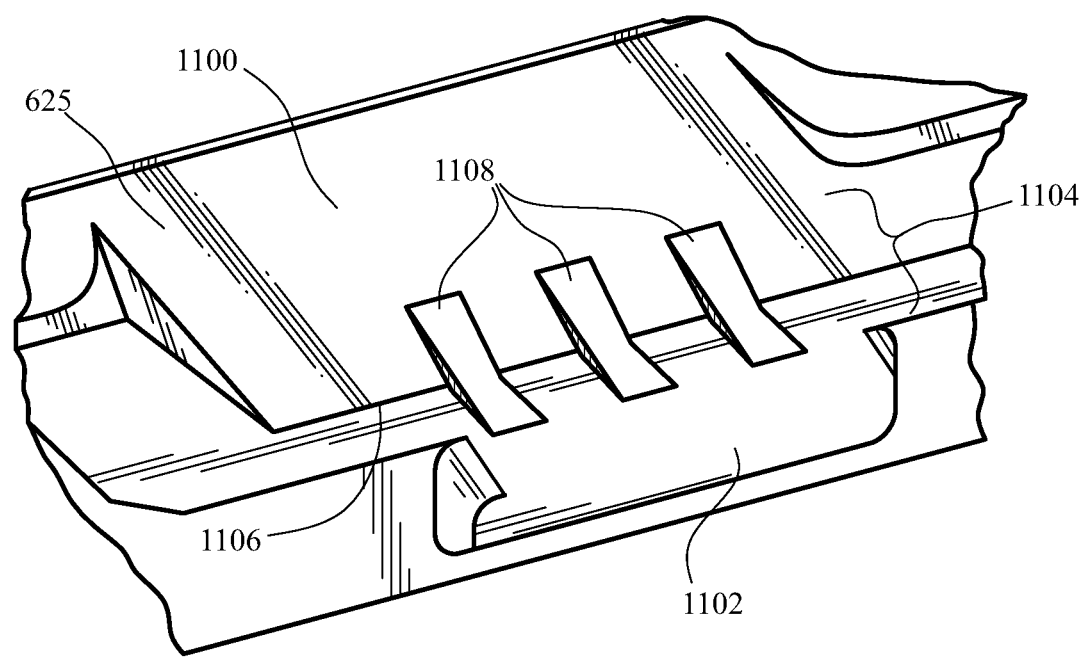
FIG. 12 shows a perspective view of a downward-facing surface of the housing of the device of FIG. 11.

FIGS. 11-12 show another embodiment of a downward-facing surface 625 having a first angled portion 1100 and a second angled portion 1102 that come together at an edge 1106. The transition portion 1104 of the downward-facing surface 625 can also comprise a set of channels or grooves 1108 that are recessed relative to the edge 1106. As shown in FIG. 12, the grooves 1108 can be laterally spaced apart along the edge 1106 and can thereby provide a passage through which fluid and particles can pass between the cover 622 and the downward-facing surface 625 after passing under the first angled portion 1100. Although three grooves 1108 are shown in the figures, any number of grooves can be positioned between the cover 622 and the downward-facing surface 625. The grooves 1108 can be positioned vertically aligned with and vertically above a first portion of the cover 622, and a second portion of the cover 622 that is laterally adjacent to the first portion can be vertically aligned with and vertically below edge 1106. Similar to gaps 710, the grooves 1108 can form apertures have generally rectangular perimeters defined by the top and side surfaces of the grooves 1108 and the cover 622. The apertures can extend and define passages along the longitudinal lengths of the grooves 1108.

Figure 13:
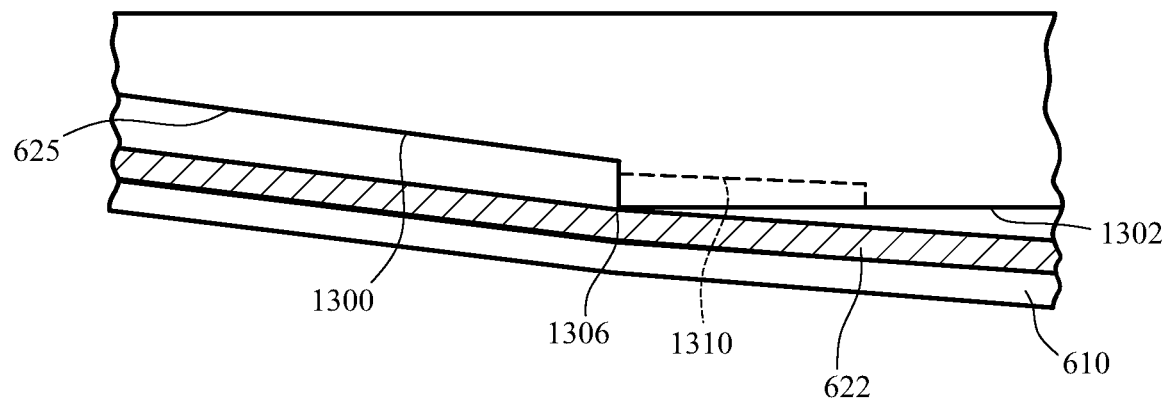
FIG. 13 shows a side section view of another embodiment of the device of FIG. 6.
Figure 14:
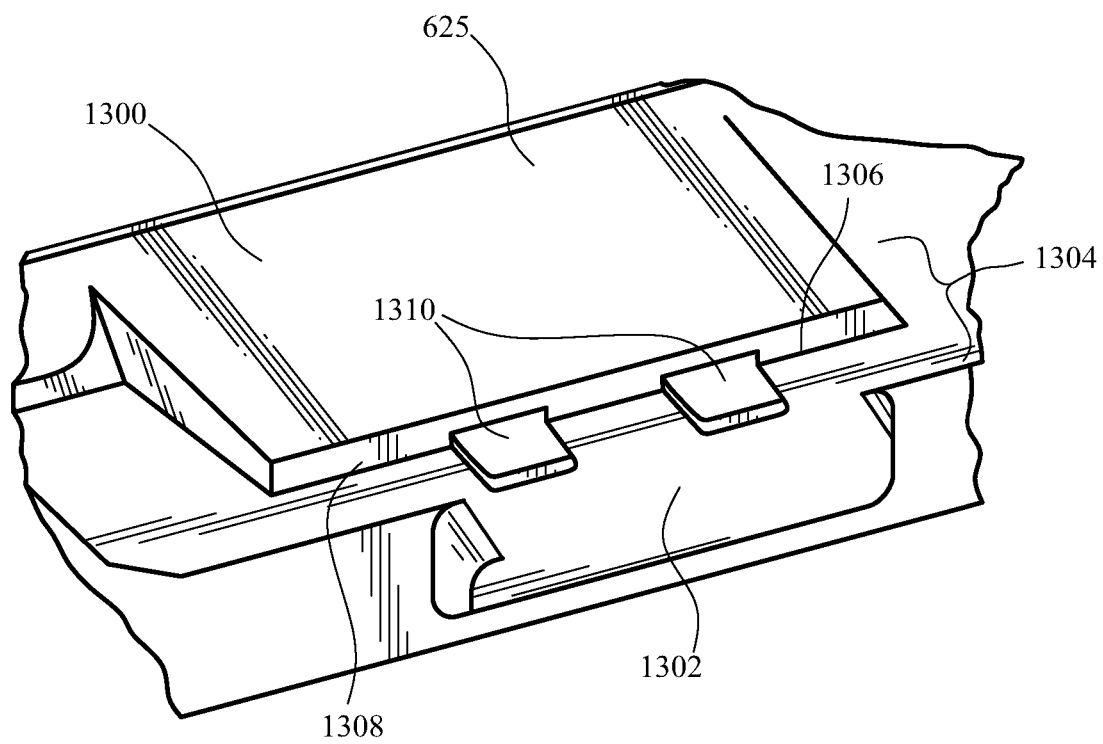
FIG. 14 shows a perspective view of a downward-facing surface of the housing of the device of FIG. 13.

FIGS. 13-14 show another embodiment of a downward-facing surface 625 having a first angled portion 1300 and a second angled portion 1302 with a third angled portion 1308 positioned between them that is similar to third angled portion 908 in positioning and orientation. The second angled portion 1302 can also comprise a set of recesses 1310 that are set into the second angled portion 1302 and into the third angled portion 1308. Accordingly, the downward-extending edge 1306 between the second and third angled portions 1302, 1308 can contact the cover 622 to offset the cover 622 from the downward-facing surface 625, similar to the downward-extending edge 906, and the recesses 1310 can allow flow over the cover 622 past the downward-extending edge 1306 and can reduce the amount of contact surface area between the cover 622 and the downward-facing surface 625, similar to the grooves 1108. The recesses 1310 can also form longitudinally-opening apertures with the cover 622 in contact with the downward-extending edge 906 in the manner described above in connection with gaps 710 and grooves 1108. In various embodiments, the apertures of the gaps 710, grooves 1108, or recesses 1310 can be hydrophilic in their material and surface tension characteristics to move invasive fluids away from tight spaces between the cover 622 and the downward-facing surface 625.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A portable computing device, comprising:
    a lid housing;
    a base housing pivotally connected to the lid housing, the base housing having a downward-facing surface, the downward-facing surface having a transition edge;
    a flexible band extending into the base housing and into the lid housing, the flexible band having an upward-facing surface;
    wherein the upward-facing surface includes a first portion disposed along a lateral axis oriented perpendicular to a longitudinal axis of the flexible band contacting the transition edge and a second portion disposed along the lateral axis spaced away from the downward-facing surface.

2. The portable computing device of claim 1, wherein the upward-facing surface is slidable against the transition edge.

3. The portable computing device of claim 1, wherein the downward-facing surface comprises a channel, wherein the second portion is vertically aligned with the channel.

4. The portable computing device of claim 1, wherein the downward-facing surface comprises a protrusion, wherein the transition edge is part of the protrusion.

5. The portable computing device of claim 1, wherein the transition edge is raised relative to a groove in the downward-facing surface.

6. The portable computing device of claim 1, wherein the downward-facing surface comprises a first angled surface portion and a second angled surface portion, wherein each of the first and second angled surface portions adjoin the transition edge.

7. The portable computing device of claim 1, wherein the first and second portions are laterally aligned on the flexible band relative to a longitudinal axis of the flexible band.

8. A laptop computer, comprising:
a lid housing;
a base housing pivotally connected to the lid housing, the base housing having an internal surface, the internal surface having a bottom surface and two adjoining side surfaces;
a flexible band extending into the base housing and having a longitudinal axis and a top surface facing the internal surface;
wherein the top surface of the flexible band and the bottom and two adjoining side surfaces of the base housing form a perimeter of an aperture extending parallel to the longitudinal axis across the top surface of the flexible band.

9. The laptop computer of claim 8, wherein the perimeter of the aperture is formed in a channel in the internal surface.

10. The laptop computer of claim 8, wherein the aperture is configured to receive fluid flow traveling on the flexible band parallel to the longitudinal axis.

11. The laptop computer of claim 8, wherein a hydrophobic material is positioned on the internal surface of the base housing or the top surface of the flexible band.

\* \* \* \* \*